(12) United States Patent
Wang et al.

(10) Patent No.: US 12,722,953 B2
(45) Date of Patent: Sep. 1, 2026

(54) CARRYING DEVICE, WAREHOUSING LOGISTICS SYSTEM, AND PALLET CARRYING METHOD

(71) Applicant: BEIJING JINGDONG QIANSHI TECHNOLOGY CO., LTD., Beijing (CN)

(72) Inventors: Guopeng Wang, Beijing (CN); Ningbo Xue, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 319 days.

(21) Appl. No.: 18/023,850

(22) PCT Filed: Sep. 29, 2021

(86) PCT No.: PCT/CN2021/121728
§ 371 (c)(1),
(2) Date: Feb. 28, 2023

(87) PCT Pub. No.: WO2022/134722
PCT Pub. Date: Jun. 30, 2022

(65) Prior Publication Data

US 2024/0025716 A1 Jan. 25, 2024

(30) Foreign Application Priority Data

Dec. 25, 2020 (CN) ......................... 202011563802.5

(51) Int. Cl.
*B66F 9/12* (2006.01)
*B65G 1/04* (2006.01)
*B66F 9/06* (2006.01)

(52) U.S. Cl.
CPC ............ *B66F 9/122* (2013.01); *B65G 1/0492* (2013.01); *B66F 9/063* (2013.01)

(58) Field of Classification Search
CPC ....... B65G 1/00492; B66F 9/063; B66F 9/122
See application file for complete search history.

(56) References Cited

U.S. PATENT DOCUMENTS 4,998,858 A * 3/1991 Magens .................. B66F 9/122
414/500
6,139,056 A 10/2000 Sourdeau
(Continued)

FOREIGN PATENT DOCUMENTS

CN 108117009 A 6/2018
CN 208617311 U 3/2019
(Continued)

OTHER PUBLICATIONS

Extended European Search Report corresponding to European Patent Application No. 21908723.6-1017 dated Jul. 25, 2024, 8 pages.
(Continued)

*Primary Examiner* — Saul Rodriguez
*Assistant Examiner* — Brendan P Tighe
(74) *Attorney, Agent, or Firm* — K&L Gates LLP

(57) ABSTRACT

Provided are a carrying device, a warehousing logistics system, and a pallet carrying method. The carrying device is configured to carry the pallet, and includes: a vehicle body configured to autonomously move; a mounting bracket horizontally and slidably disposed on the vehicle body; and a fork arm, where a first end of the fork arm is connected to the mounting bracket, the fork arm is configured to protrude horizontally along with movement of the mounting bracket to be inserted into a fork hole of the pallet, and raise and lower relative to the vehicle body to lift the pallet, and the vehicle body and the mounting bracket are configured to, when the fork arm lifts the pallet, enable the pallet to be located above the vehicle body by relative movement between the vehicle body and the mounting bracket.

11 Claims, 8 Drawing Sheets

(56) References Cited

U.S. PATENT DOCUMENTS

| | | | | |
|---|---|---|---|---|
| 2005/0042068 | A1* | 2/2005 | Ehmen | B66F 9/10 414/661 |
| 2005/0133310 | A1* | 6/2005 | Putnam | B66F 7/0641 187/211 |
| 2005/0208168 | A1* | 9/2005 | Hickerson | B29C 64/214 425/375 |
| 2006/0186386 | A1* | 8/2006 | Landsberger | B01L 9/00 254/106 |
| 2007/0272489 | A1* | 11/2007 | Putnam | B66F 7/0641 187/203 |
| 2008/0006800 | A1* | 1/2008 | Kikuchi | B66F 3/12 254/126 |
| 2008/0114367 | A1* | 5/2008 | Meyer | A61F 2/442 606/191 |
| 2010/0277584 | A1* | 11/2010 | Price | F16M 11/18 248/422 |
| 2011/0110749 | A1* | 5/2011 | Carter | B65H 39/10 412/33 |
| 2011/0122381 | A1* | 5/2011 | Hickerson | B33Y 30/00 355/45 |
| 2013/0075678 | A1* | 3/2013 | Kozora | B66F 3/12 254/126 |
| 2015/0137567 | A1* | 5/2015 | Smith | A61G 5/0858 297/183.1 |
| 2016/0221545 | A1* | 8/2016 | Fiwek | B60S 9/06 |
| 2019/0352158 | A1* | 11/2019 | Tani | B66F 9/063 |
| 2020/0307974 | A1* | 10/2020 | Hasegawa | B66F 9/24 |
| 2021/0070594 | A1* | 3/2021 | Nakamoto | B66F 9/087 |
| 2022/0063969 | A1* | 3/2022 | Marshall | B66F 9/07568 |
| 2022/0204327 | A1* | 6/2022 | Sun | B66F 9/122 |
| 2022/0242712 | A1* | 8/2022 | Sun | B66F 9/07586 |

FOREIGN PATENT DOCUMENTS

| | | | | | |
|---|---|---|---|---|---|
| CN | 208963204 | U | * | 6/2019 | |
| CN | 109987554 | A | | 7/2019 | |
| CN | 209367752 | U | | 9/2019 | |
| CN | 111017816 | A | * | 4/2020 | B66F 9/12 |
| CN | 111717851 | A | | 9/2020 | |
| CN | 211393743 | U | | 9/2020 | |
| CN | 111874836 | A | | 11/2020 | |
| CN | 112849870 | A | | 5/2021 | |
| CN | 214651055 | U | | 11/2021 | |
| CN | 221643424 | U | * | 9/2024 | |
| EP | 0477154 | A1 | | 3/1992 | |
| EP | 0978438 | A1 | * | 2/2000 | B62B 3/0618 |
| EP | 1388519 | A2 | | 2/2004 | |
| EP | 4194365 | A1 | | 6/2023 | |
| JP | 2000-198685 | A | | 7/2000 | |
| JP | 2005029082 | A | | 2/2005 | |
| JP | 2005-119777 | A | | 5/2005 | |
| JP | 2018-111589 | A | | 7/2018 | |
| JP | 2018-165197 | A | | 10/2018 | |
| JP | 2023540634 | A | | 9/2023 | |
| WO | WO2008/129447 | A1 | | 10/2008 | |
| WO | WO-2019010509 | A1 | * | 1/2019 | B66F 9/122 |
| WO | 2020067371 | A1 | | 4/2020 | |
| WO | WO2022134722 | A1 | | 6/2022 | |
| WO | WO-2022142668 | A1 | * | 7/2022 | B66F 9/06 |

OTHER PUBLICATIONS

International Preliminary Report on Patentability received in PCT Application No. CN2021/121728, mailed on Jun. 13, 2023, 7 pages.

Office Action (Decision of Refusal) corresponding to Japanese Patent Application No. 2023-516175 dated Jun. 21, 2024, 6 pages. (Translation).

Office Action corresponding to Chinese Application No. 202011563802.5 dated May 30, 2024, 22 pages.

Office Action corresponding to Japanese Patent Application No. 2023-516175 dated Mar. 7, 2024, 6 pages. (Translation).

Supplemental Search Report corresponding to Chinese Application No. 202011563802.5 dated May 28, 2024, 7 pages.

Written Opinion received in PCT Application No. CN2021/121728, mailed on Dec. 7, 2021, 12 pages.

International Search Report PCT Application No. CN2021/121728 dated Dec. 7, 2021.

Office Action dated Apr. 28, 2025 for corresponding Chinese Application No. 202011563802.5.

Office Action dated Apr. 28, 2025 for corresponding Chinese Application No. 202011563802.5 (English Translation).

* cited by examiner

CARRYING DEVICE, WAREHOUSING LOGISTICS SYSTEM, AND PALLET CARRYING METHOD

CROSS-REFERENCE TO RELATED APPLICATIONS

This is a National Stage Application filed under 35 U.S.C. 371 based on International Patent Application No. PCT/CN2021/121728, filed on Sep. 29, 2021, which claims priority to Chinese Patent Application No. 202011563802.5, filed with the China National Intellectual Property Administration (CNIPA) on Dec. 25, 2020, the disclosures of which are incorporated herein by reference in their entireties.

FIELD

The present application relates to the field of warehousing and logistics technologies, for example, to a carrying device, a warehousing and logistics system and a pallet carrying method.

BACKGROUND

With the high-efficiency and automated development of the warehousing and logistics industry, carrying devices with autonomous movement functions are widely used in many links of the warehousing and logistics industry to achieve efficient and automated carrying of materials.

Pallets are vehicles configured to carry materials in warehousing and logistics. After the materials are placed on a pallet, a carrying device moves to the position of the pallet, and the carrying device, after being docked to fork holes in the pallet, fork into the pallet to lift and carry the pallet, thereby carrying the materials on the pallet. According to the opening manners of fork holes in pallets, the pallets are generally classified as character 日-shaped pallets, character 川-shaped pallets and character 田-shaped pallets.

The devices for carrying pallets generally include an electric forklift and an automatic forklift.

The fork arms of the electric forklift or the fork arms of the automatic forklift are inserted into the fork holes to carry the pallet. The fork arms of the automatic forklift can lift vertically so as to carry different types of pallets, but it generally has disadvantages of large volume, large turning radius, and large space occupation. The electric forklift can only carry the character 川-shaped pallets and cannot carry the character 口-shaped pallet and the character 田-shaped pallet, and the scope of use is limited.

SUMMARY

The present application provides a carrying device, a warehousing logistics system and a pallet carrying method, so as to reduce the space occupied by the carrying device and the turning radius when the carrying device carries the pallet, and improve the flexibility and versatility of the use of the carrying device.

A carrying device configured to carry a pallet is provided, and the carrying device includes a vehicle body, a mounting bracket and a fork arm.

The vehicle body is configured to move autonomously.

The mounting bracket is horizontally slidably disposed on the vehicle body.

A first end of the fork arm is connected to the mounting bracket, and the fork arm is configured to protrude horizontally along with the movement of the mounting bracket to be inserted into a fork hole of the pallet, and raise or lower relative to the vehicle body to lift the pallet, and the vehicle body and the mounting bracket are configured to, when the fork arm lifts the pallet, enable the pallet to be located above the vehicle body by the relative movement between the vehicle body and the mounting bracket.

A warehousing logistics system is provided and includes the above-described carrying device.

A pallet carrying method applying the above-described carrying device to carry a pallet is provided, and the method includes the following: operating the mounting bracket of the carrying device to move horizontally relative to the vehicle body of the carrying device to enable the fork arm of the carrying device to protrude into the fork hole of the pallet; operating the fork arm to move vertically relative to the vehicle body to lift the pallet; and operating the mounting bracket to move horizontally relative to the vehicle body to enable the pallet to be located right above the vehicle body.

REFERENCE NUMERALS IN THE DRAWINGS

Figure 1:
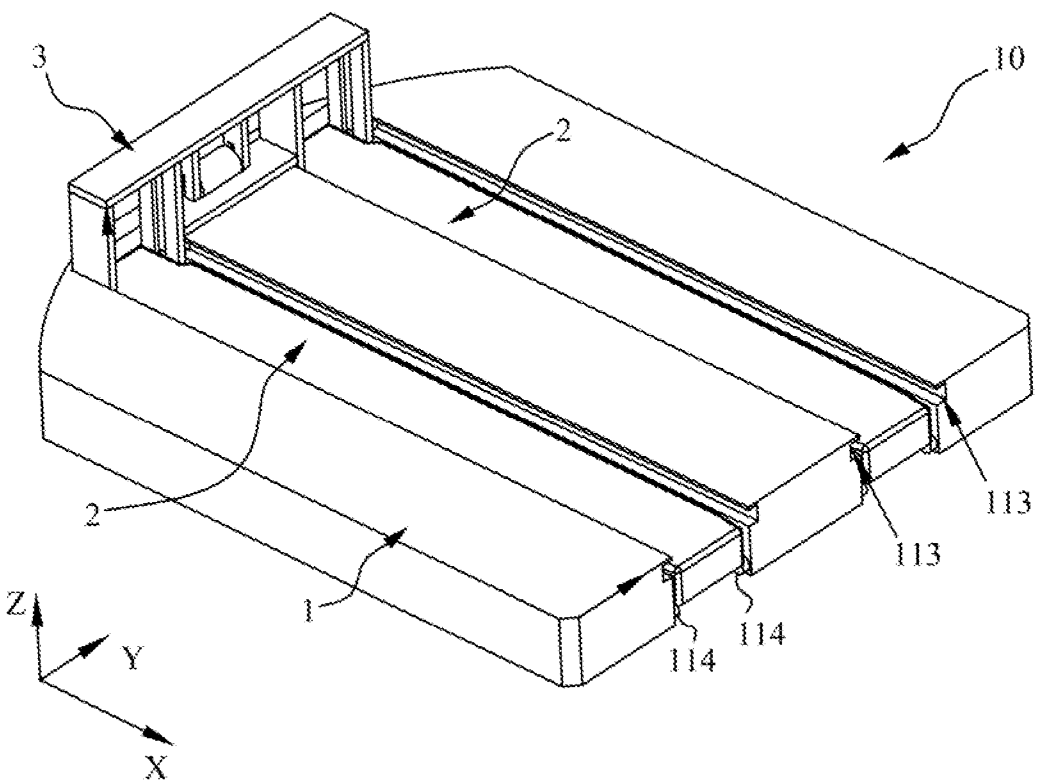
FIG. 1 is a structural diagram of a carrying device in an initial state according to embodiment one of the present application.

10 carrying device;
20 pallet;
201 fork hole;
1 vehicle body;
11 housing;
111 bearing surface;
112 accommodation groove;
1121 position-limiting groove wall;
113 X-direction guide groove;
114 first guide rolling wheel;
12 driving wheel;
13 universal wheel;
2 fork arm;
21 arm body;
22 lifting driving mechanism;
221 screw rod;
2211 first thread segment;
2212 second thread segment;
2213 third thread segment;
2214 first plain shaft segment;
2215 second plain shaft segment;
222 first connecting rod;
223 first nut seat;
224 second nut seat;
2241 thread sleeve part;
2242 position-limiting seat part;
2243 sliding seat part;
225 second connecting rod;
226 screw rod seat;
227 lifting driving motor;
228 speed reducer;
229 position-limiting sleeve;
23 support;
24 third guide rolling wheel;
25 hinge shaft;
3 translation driving mechanism;
31 mounting bracket;
311 bracket part;
3111 side plate;
3112 connecting part;
3113 Z-direction guide groove;
3114 hinge hole;
312 connecting bracket part;
3121 mounting groove;
313 bracket top plate;
32 electric roller;
321 rolling member;
322 mounting shaft;
33 elastic member;
34 second guide rolling wheel.

DETAILED DESCRIPTION

The present application is described hereinafter in conjunction with the drawings and embodiments.

In the description of the present application, unless otherwise specified and limited, the terms "join", "connected", "fixing" are to be construed in a broad sense, for example, as permanently connected, detachably connected, or integrally connected; mechanically connected or electrically connected; directly connected to each other or indirectly connected to each other via an intermediary; or internally connection of two components or interacting relationship of two elements. Specific meanings of the preceding terms in the present application may be construed based on specific situations.

In this application, unless otherwise specified and limited, a first feature being "on" or "under" a second feature may include direct contact between the first feature and the second feature, and may also include the first feature and the second feature not in direct contact but contact through another feature between them. Moreover, the first feature "on", "above" and "over" the second feature include that the first feature is directly above and obliquely above the second feature, or simply means that the horizontal level of the first feature is higher than the horizontal level of the second feature. The first feature "under", "below" and "beneath" the second feature include that the first feature is directly below and obliquely below the second feature, or simply means that the horizontal level of the first feature is smaller than the horizontal level of the second feature.

In the description of the present application, it is to be noted that, the orientational or positional relationships indicated by terms "above", "below", "right" and the like are based on the orientational or positional relationships shown in the drawings, merely for ease of describing and simplifying the description, rather than indicating or implying that the referred device or element must have a specific orientation and is constructed and operated in a specific orientation, and thus they are not to be construed as limiting the present application. In addition, the terms "first", "second" are used only to distinguish between descriptions, and have no special implication.

Embodiment One

Figure 2:
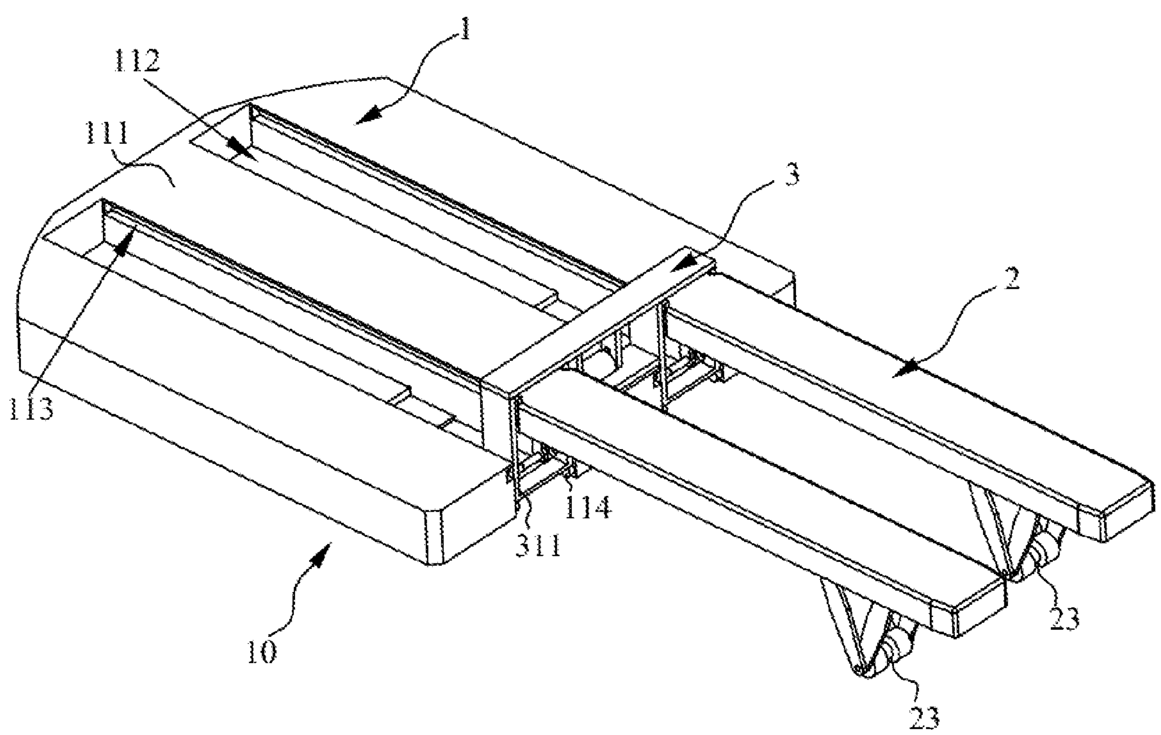
FIG. 2 is a structural diagram of a carrying device in a state in which a fork arm protrudes out according to embodiment one of the present application.
Figure 3:
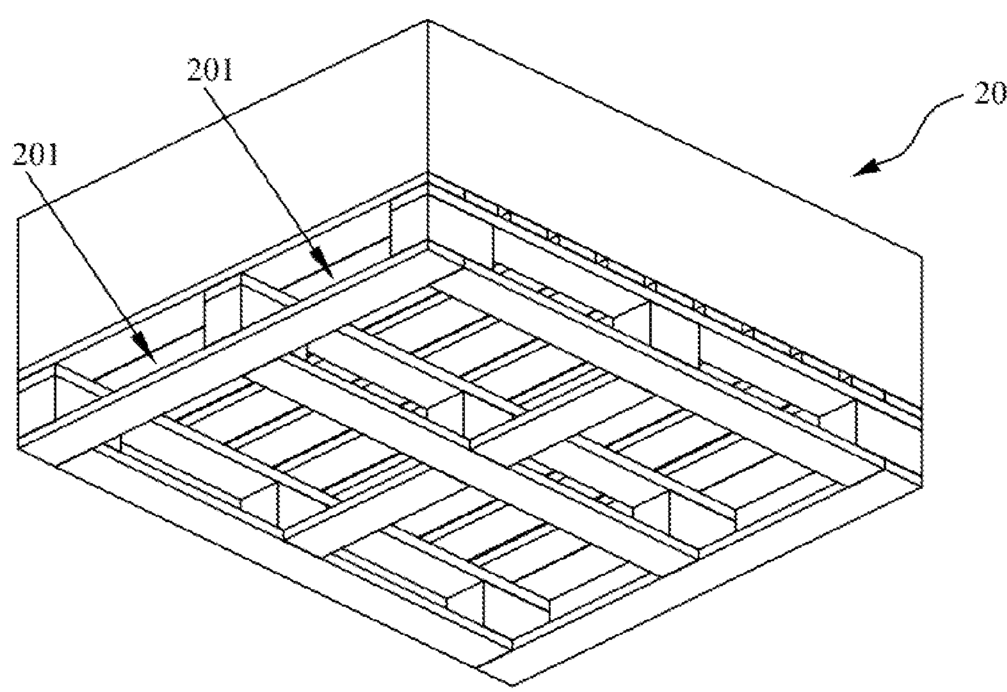
FIG. 3 is a structural diagram of a pallet according to embodiment one of the present application.

As shown in FIG. 1 to FIG. 3, a carrying device 10 is provided according to this embodiment. The carrying device 10 may be applied in a warehousing logistics system to carry a pallet 20 configured to bear materials in a forking and lifting manner, so as to improve the efficiency of material carrying and ease of carrying. The carrying device 10 according to this embodiment may be an automated guided vehicle (AGV) carrying device, or an autonomous mobile robot (AMR) carrying device, or other forms of carrying devices capable of carrying materials or pallets 20.

The carrying device 10 includes a vehicle body 1, a mounting bracket 31 and a fork arm 2. The vehicle body 1 can move autonomously, the fork arm 2 is disposed on the vehicle body 1, and the mounting bracket 31 can be horizontally slidably disposed on the vehicle body 1. A first end of the fork arm 2 is connected to the mounting bracket 31, and the fork arm 2 is configured to protrude horizontally along with the movement of the mounting bracket 31 to be inserted into the fork hole 201 of the pallet 20, and raise or lower relative to the vehicle body 1 to lift the pallet 20, and when the fork arm 2 lifts the pallet 20, the relative movement between the vehicle body 1 and the mounting bracket 31 enables the pallet 20 to be located above the vehicle body 1.

According to the carrying device 10 in this embodiment, the fork arm 2 can horizontally move and vertically raise or lower relative to the vehicle body 1, so when the pallet 20 needs to be carried, the fork arm 2 may move horizontally relative to the vehicle body 1 to partially protrude out of the vehicle body 1 so that the fork arm 2 is inserted into the fork hole 201 of the pallet 20; then the pallet 20 is lifted by the raising of the fork arm 2 relative to the vehicle body 1 so that the pallet 20 is lifted and off the ground; when the pallet 20 is lifted to a certain height, the fork arm 2 retracts relative to the vehicle body 1 so that the vehicle body 1 may at least partially enter the space under the bottom of the pallet 20; and then the pallet 20 is entirely supported on the vehicle body 1 and/or the fork arm 2 by the lowering of the fork arm 2.

According to the carrying device 10 provided in this embodiment, the fork arm 2 that can move horizontally and raise or lower vertically relative to the vehicle body 1 is provided, whereby when the carrying device 10 is initially docked to the pallet 20 for carrying, it is only needed that the fork arm 2 protrudes into the fork hole 201, the vehicle body 1 is located outside the pallet 20, and when the pallet 20 is lifted to a preset height, the vehicle body 1 can partially enter the space under the bottom of the pallet 20, so that while ensuring that the carrying device 10 achieves forking and lifting the pallet 20, the pallet can be located above the vehicle body 1 during the carrying device 10 carrying the pallet 20. Therefore, in the process of carrying the pallet 20, the size of the carrying device 10 in the protruding direction of the fork arm 2 can be reduced, the turning radius of the carrying device 10 and the space occupied by the carrying device 10 in carrying the pallet 20 can be reduced, and the usage flexibility of the carrying device 10 cane be improved. Moreover, since one end of the fork arm 2 is connected to the mounting bracket 31 and the mounting bracket 31 is slidably disposed on the vehicle body 1, after the fork arm 2 protrudes relative to the vehicle body 1, the part of the fork arm 2 not connected to the mounting bracket 31 can be suspended in the air, and thus even for a character 川-shaped pallet having a bottom beam or a character 日-shaped pallet having a bottom beam, the fork arm 2 can cross over the bottom beam and enter the fork hole 201 without hindrance. Therefore, the carrying device 10 is applicable to carrying many different types of pallets, and has high flexibility and a wide range of applications.

The above-described pallet 20 may be a character FEE-shaped pallet as shown in FIG. 3, or may be a character 日-shaped pallet or a character III-shaped pallet or pallets having other structures, as long as the pallet is provided with the fork hole 201 for insertion of the fork arm 2. The structure of the pallet 20 that can be carried by the carrying device 10 is not limited in this embodiment. In this embodiment, the character 田-shaped pallet with the national standard 1200×1000×153 mm is taken as an example to introduce the structure of the carrying device 10. The carrying of other types of pallets 20 by the carrying device 10 can refer to the carrying of the character 田-shaped pallet 20 by the carrying device 10, which is not repeated in this embodiment.

For the convenience of description, a coordinate system is established with reference to the direction shown in FIG. 1, where an X direction is a protruding direction of the fork arm 2, a Z direction is a height direction, and a Y direction is determined according to the right-hand rule.

For the convenience of description, a state in which the carrying device 10 is not docked to the pallet 20 is taken as an initial state; a state in which the fork arm 2 protrudes relative to the vehicle body 1 in the X-direction but does not raise is taken as a protruding state of the fork arm 2, a state in which the fork arm 2 protrudes relative to the vehicle body 1 and raises to a certain height relative to the vehicle body 1 is referred as a protruding and lifting state of the fork arm 2, a state in which the fork arm 2 retracts to a horizontal initial position and raises to a certain height relative to the vehicle body 1 is referred as a retracting and lifting state of the fork arm 2, a state of the fork arm 2 in which the carrying device 10 completes docking to the pallet 20 is referred as a docking-in-place state. That is, from the carrying device 10 starting to dock to the pallet 20 to the carrying device 10 docked to the pallet 20 in place, the carrying device 10 goes through the initial state, the protruding state, the protruding and lifting state, the retracting and lifting state, and the docking-in-place state.

In order to improve the carrying stability of the pallet 20, multiple fork arms 2 are provided at intervals in the Y direction. Generally, two fork holes 201 are provided in the pallet 20, that is, two fork arms 2 are correspondingly provided. When the size of the material is relatively large, causing that there may be three or more fork holes 201 in the pallet 20, three or more fork arms 2 may be provided correspondingly.

Figure 4:
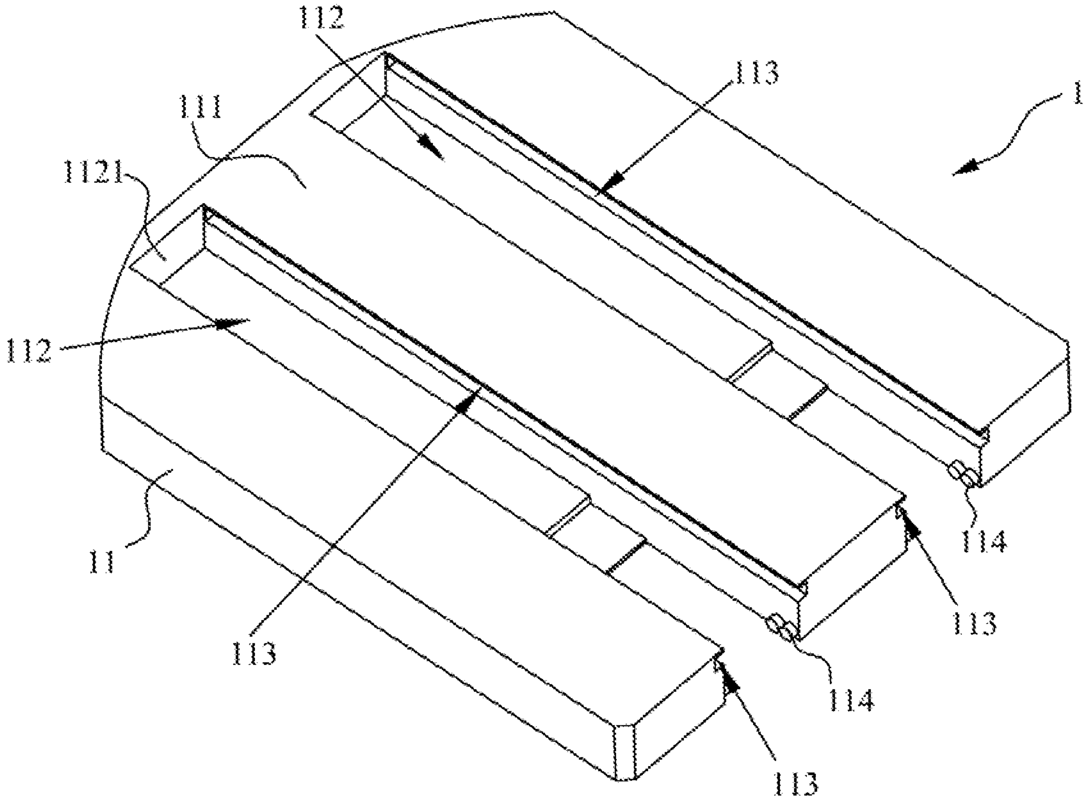
FIG. 4 is a diagram showing a front-side structure of a vehicle body according to embodiment one of the present application.

As shown in FIG. 4, in order to improve the structural compactness of the carrying device 10 and reduce the volume of the carrying device 10, a bearing surface 111 configured to bear the pallet is formed on an upper surface of the vehicle body 1, and the bearing surface 111 is provided with accommodation grooves 112 at a position corresponding to the fork arm 2. The accommodation groove 112 extends in the X direction and has one end running through the corresponding side wall of the vehicle body 1, and another end formed with a position-limiting groove wall 1121, the position-limiting groove wall 1121 restricts the fork arm 2 from protruding out of the vehicle body 1 in the opposite direction. When the fork arm 2 is in the initial state, the fork arm 2 is at least partially accommodated in the accommodation groove 112. The arrangement of the accommodation groove 112 can reduce the overall thickness of the carrying device 10 in the Z direction, improve the compactness of the structure, and is beneficial to guiding the sliding of the fork arm 2 in the X direction.

The depth of the accommodation groove 112 is greater than the thickness of the fork arm 2 in the Z direction, and when the carrying device 10 is in the initial state, an upper surface of the fork arm 2 is lower than the upper surface of the vehicle body 1. This arrangement can make the pallet 20 be fully supported on the vehicle body 1 after the docking between the carrying device 10 and the pallet 20 is completed, avoid fatigue damage of the form arm 2 caused by supporting the pallet for a long time, improve the service life of the fork arm 2, and can improve stability of the supporting the pallet 20. In other embodiments, the upper surface of the fork arm 2 may be higher than the upper surface of the vehicle body 1 or the upper surface of the fork arm 2 may be level with the upper surface of the vehicle body 1. The length of the accommodation groove 112 in the X direction is greater than the length of the fork arm 2, and when the carrying device 10 is in the initial state, the fork arm 2 is completely accommodated in the accommodation groove 112.

In this embodiment, in order to improve the stability of the protruding of the fork arm 2 in the X direction, first guide rolling wheels 114 are provided on opposite walls of the accommodation groove 112 extending in the X direction, and the first guide rolling wheels 114 are arranged at positions close to an opening of the accommodation groove 112. When the fork arm 2 is slidably disposed in the accommodation groove 112, the fork arm 2 is supported on the first guide rolling wheel 114. The setting of the first guide rolling wheel 114 can not only support and guide the sliding of the fork arm 2 in the accommodation groove 112, but also avoid interfering with the raising or lowering of the fork arm 2 relative to the vehicle body 1.

Figure 5:
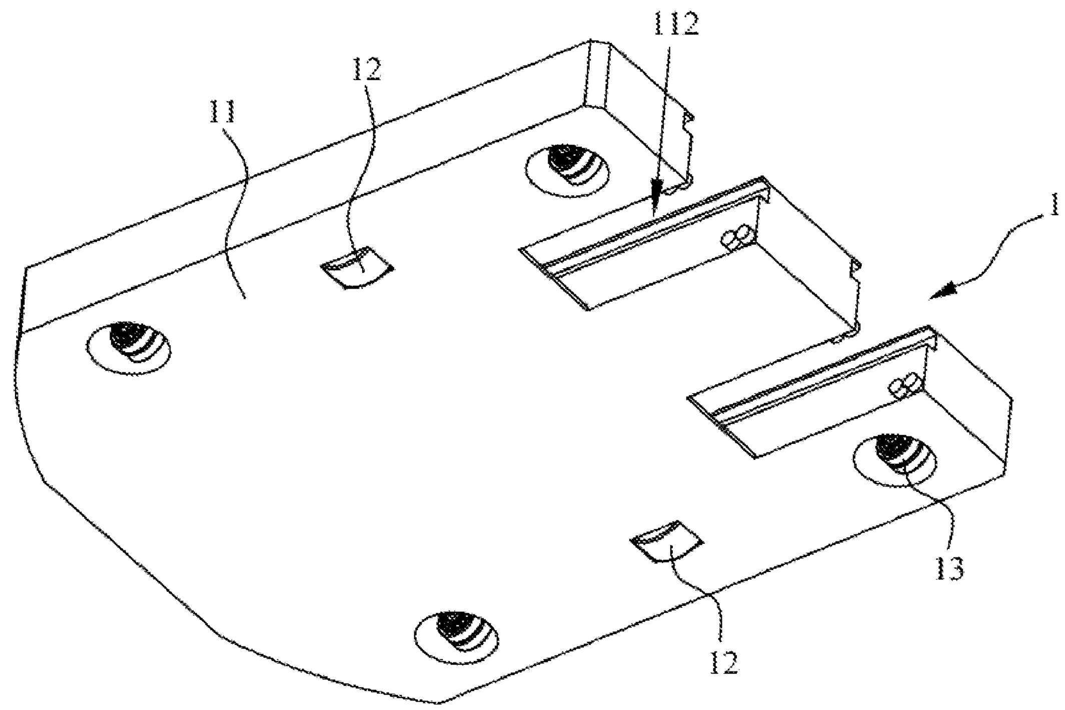
FIG. 5 is a diagram showing a back-side structure of a vehicle body according to embodiment one of the present application.

As shown in FIG. 4 and FIG. 5, in order to achieve the autonomous movement function of the vehicle body 1, the vehicle body 1 includes a housing 11 and a driving wheel mechanism, and the above-described accommodation groove 112 is opened in the surface of the housing 11. The driving wheel mechanism includes a driving wheel 12 and a driving motor configured to drive the driving wheel 12 to rotate. The driving wheel 12 is disposed at the bottom of the housing 11, and the driving motor is disposed inside the housing 11. In this embodiment, two driving wheels 12 are arranged symmetrically relative to a central longitudinal axis, so as to improve driving stability. The vehicle body 1 further includes four universal wheels 13, the four universal wheels 13 are arranged in a rectangular shape, and each of the driving wheels 12 is arranged between two universal wheels 13.

In other embodiments, the number and positions of the driving wheels 12 and universal wheels 13 can be set according to requirements, and the driving form of the driving wheel mechanism can be differential driving or other driving forms, as long as movements of the carrying device such as forward moving, backward moving, turning, in-situ rotation can be achieved, and the structure of the driving wheel mechanism is not limited in the present application.

The vehicle body 1 is arranged symmetrically relative to the central longitudinal axis, and the two fork arms 2 are arranged symmetrically relative to the central longitudinal axis, so as to improve the running stability and structural compactness of the carrying device 10.

Figure 6:
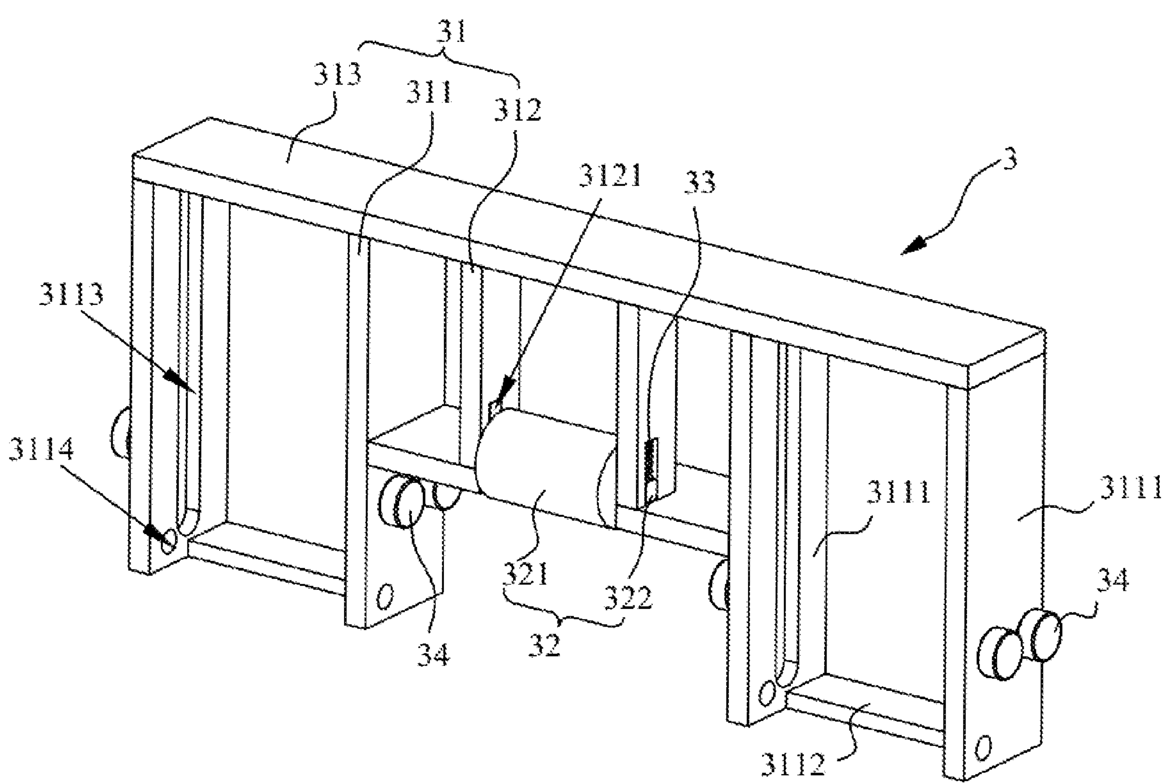
FIG. 6 is a structural diagram of a translation driving mechanism according to embodiment one of the present application.

As shown in FIG. 1, FIG. 2 and FIG. 6, the carrying device 10 further includes a translation driving mechanism 3, the translation driving mechanism 3 is connected to each of the two fork arms 2 to drive the two fork arms 2 to move synchronously in the X direction. Such an arrangement can reduce the driving cost, improve the carrying efficiency of the carrying device and ensure the synchronization of translation of the two fork arms 2. In other embodiments, it is also possible that each of the fork arms 2 is provided with a respective one of translation driving mechanisms 3.

The translation driving mechanism 3 includes the above-described mounting bracket 31 and a horizontal driving unit disposed on the mounting bracket 31. The mounting bracket 31 is slidably fitted with the groove walls of the accommodation groove 112. One end of the fork arm 2 close to the position-limiting groove wall 1121 is connected to the mounting bracket 31, and the horizontal driving unit drives the mounting bracket 31 to move relative to the vehicle body 1 in the X direction. With such an arrangement, the two fork arms 2 are driven to move synchronously through the movement of the mounting bracket 31, therefore, the structure is compact and the setting is easy. In other embodiments, it is also possible that a fixed end of the horizontal driving unit is fixed relative to the vehicle body 1, and a driving end of the horizontal driving unit is connected to the fork arm 2 to drive the fork arm 2 to move.

In order to improve the stability of the sliding connection between the mounting bracket 31 and the vehicle body 1, the mounting bracket 31 has two bracket parts 311 arranged at an interval in the Y direction. Lower ends of the two bracket parts 311 respectively protrude into two accommodation grooves 112 and to be slidably connected to the groove walls of the accommodation groves 112, and the horizontal driving unit is connected between the two bracket parts 311. With such an arrangement, the accommodation grooves 112 can also be used as guide grooves of the mounting bracket 31, thus ensuring the stability and direction accuracy of the horizontal movement of the fork arms 2.

As shown in FIG. 4, at least one groove wall, extending in the X direction, of the accommodation groove 112 is provided with an X-direction guide groove 113, and the X-direction guide groove 113 extends in the X direction and runs through the side of the vehicle body 1 away from the position-limiting groove wall 1121. The bracket part 311 is provided with a guide part corresponding to the X-direction guide groove 113, and the guide part protrudes into the corresponding X-direction guide groove 113 and is in a rolling or sliding connection to the groove wall of the X-direction guide groove 113. The arrangement of the X-direction guide groove 113 and the guide part enables the mounting bracket 31 to be inserted into the accommodation groove 112 from an opening end of the accommodation groove 112, and moreover, prevents the mounting bracket 31 from leaving the accommodation groove 112 in the Z direction. Thus, the structure is simple and the cost is low.

In other embodiments, other X-direction guide groove structures may also be provided to achieve the sliding connection between the mounting bracket 31 and the vehicle body 1, for example, guide rails are provided on the groove walls of the accommodation groove 112, and sliding blocks fitted with the guide rails are connected to the mounting bracket 31. In this embodiment, as shown in FIG. 6, the guide part is a second guide rolling wheel 34, and the second guide rolling wheel 34 is cooperated with the X-direction guide groove 113 in a rolling manner to reduce friction. In other embodiments, the guide part may also be a slider or the like.

The bracket part 311 includes two side plates 3111 arranged at an interval in the Y direction, and outer side surfaces of the two side plates 3111 are respectively provided with second guide rolling wheels 34. Correspondingly, two groove walls, oppositely provided in the Y direction, of the accommodation groove 112 are each provided with an X-direction guide groove 113 to improve the stability of movement of the mounting bracket 31 in the X direction. Each of the side plates 3111 is provided with multiple second guide rolling wheels 34 in the X direction.

In order to avoid the relative displacement between the ends of the two side plates 3111, the bracket part 311 further includes a connecting part 3112 connected between lower ends of the side plates 3111 to enhance the structural strength and rigidity of the bracket part 311. The connecting part 3112 can be, but is not limited to, a plate-shaped structure.

The mounting bracket 31 further includes a bracket top plate 313 connected to top ends of the two bracket parts 311. The bracket top plate 313 extends in the Y direction, and the upper ends of the side plates 3111 are vertically connected to the bracket top plate 313, thereby forming spaces for connecting the fork arms 2 between the bracket top plate 313 and the bracket parts 311.

In this embodiment, the horizontal driving unit drives the mounting bracket 31 to slide relative to the vehicle body 1 by rolling driving, the horizontal driving unit includes a rolling member 321, a mounting shaft 322 for mounting the rolling member 321, and a horizontal driving motor for driving the rolling member 321 to rotate. The rolling member 321 is located above the vehicle body 1 and is in rolling contact with the upper surface of the vehicle body 1. The mounting shaft 322 extends in the Y direction and two ends of the mounting shaft 322 are connected to the mounting bracket 31. The horizontal driving motor is configured to drive the rolling member 321 to rotate around the mounting shaft 322, so as to achieve the movement of the mounting bracket 31 relative to the vehicle body 1 in the X direction.

The translation driving mechanism 3 adopts a rolling drive manner to move relative to the vehicle body in the X direction, so that multiple structures of the horizontal driving unit are all arranged on the mounting bracket 31, to allow the horizontal driving unit to have a compact structure, a small footprint, a high transmission efficiency, a stable operation and other advantages. Moreover, this driving form that the fork arm 2 protrudes out is more conducive to enable the vehicle body 1 to move autonomously to a space under the bottom of the pallet 20 in a case where the fork arm 2 remains stationary and the fork arm 2 protrudes out relative to the vehicle body 1 and lifts the pallet 20, which reduces the requirements for the driving power of the horizontal driving unit.

Thus, the overall volume of the horizontal driving unit can be reduced, to allow the structures of the translation driving mechanism 3 and the carrying device 10 to be more compact. In other embodiments, other driving structures that can achieve the movement of the mounting bracket 31 in the X direction can also be used, such as a structure in which a rotating motor is cooperated with a pinion and rack, and a mechanism in which a rotating motor is cooperated with a screw rod and nut.

In order to simplify the structure, the rolling member 321 is a roller, and the horizontal driving unit adopts the structural form of an electric roller 32. The mounting shaft 322 of the electric roller 32 extends in the Y direction and two ends of the mounting shaft 322 are respectively connected to the mounting bracket 31. The electric roller 32 is located above the vehicle body 1 and presses against the upper surface of the vehicle body 1. By arranging the horizontal driving unit as the electric roller 32, the horizontal driving motor can be hidden inside the rolling member 321, so that the structure of the horizontal driving unit is more compact and occupies less space, which is beneficial to the miniaturization design of the carrying device 10.

For the convenience of the mounting of the electric roller 32, a connecting bracket part 312 is further provided between the two bracket parts 311, two connecting bracket parts 312 are provided at an interval in the Y direction, upper ends of the connecting bracket parts 312 are connected to the bracket top plate 313, lower ends of the connecting bracket parts 312 are higher than the upper surface of the vehicle body 1, and the electric roller 32 is sandwiched between the two connecting bracket parts 312.

To facilitate the mounting of the electric roller 32, a side, facing towards the electric roller 32, of each of the connecting bracket parts 312 is provided with a mounting groove 3121, and the mounting shaft 322 of the electric roller 32 is inserted into the mounting groove 3121. In order to prevent the electric roller 32 from slipping relative to the surface of the vehicle body 1, an elastic member 33 is further provided on the mounting bracket 31, and the elastic member 33 is configured to elastically press the electric roller 32 against the upper surface of the vehicle body 1.

In this embodiment, the elastic member 33 is a spring vertically disposed in the mounting groove 3121, an upper end of the spring is connected to an upper groove wall of the mounting groove 3121, a lower end of the spring is pressed against the mounting shaft 322, and the spring is always in a compression state. In other embodiments, the elastic member 33 may also be other elements capable of providing elastic pressing force, such as elastic pads and the like.

In order to improve the compactness of the structure, a first end of the fork arm 2 is located between the two side plates 3111, and the fork arm 2 is slidably connected to the mounting bracket 31 and can be raised or lowered relative to the mounting bracket 31 in the Z direction. This arrangement can concentrate the drive transmission structures for driving the fork arm 2 to move horizontally and vertically all on the fork arm 2 and the mounting bracket 31, simplify the structural arrangement on the vehicle body 1, and improve the compactness of the structure. In other embodiments, it is also possible that the mounting bracket 31 can be raised or lowered relative to the vehicle body 1, so that the two fork arms 2 can be raised or lowered by the raising or lowering of the mounting bracket 31.

As shown in FIG. 2, in this embodiment, when the carrying device 10 is in the protruding state of the fork arm 2, the mounting bracket 31 is located close to the opening of the accommodation groove 112. In order to prevent the free end of the fork arm 2 from sagging or deforming due to the excessive extension of the fork arm 2, the fork arm 2 is configured to switch between being supported on the ground and being off the ground, so that the fork arm 2 crosses over the bottom beam of the pallet 20 when being off the ground, and after the fork arm 2 is partially inserted into the fork hole 201, the part of the form arm 2 located inside the fork hole 201 can be supported on the ground. Such an arrangement enables a support 23 to have an auxiliary supporting effect for the fork arm 2 when the fork arm 2 crosses over the bottom beam of the character 川-shaped pallet or the character 日-shaped pallet.

Figure 7:
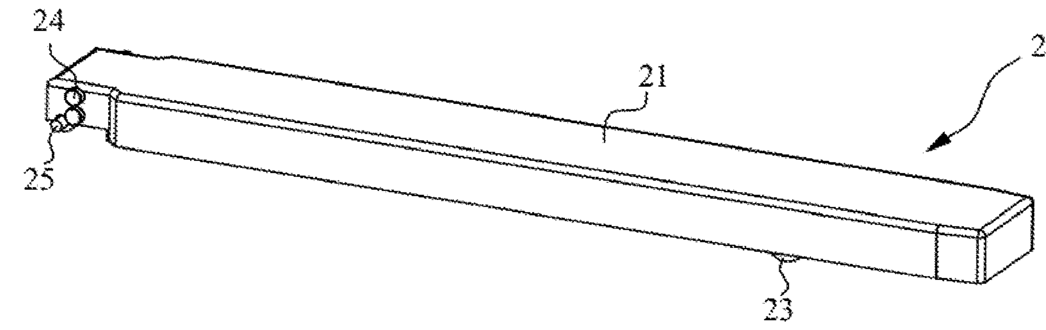
FIG. 7 is a structural diagram of a fork arm according to embodiment one of the present application.
Figure 8:
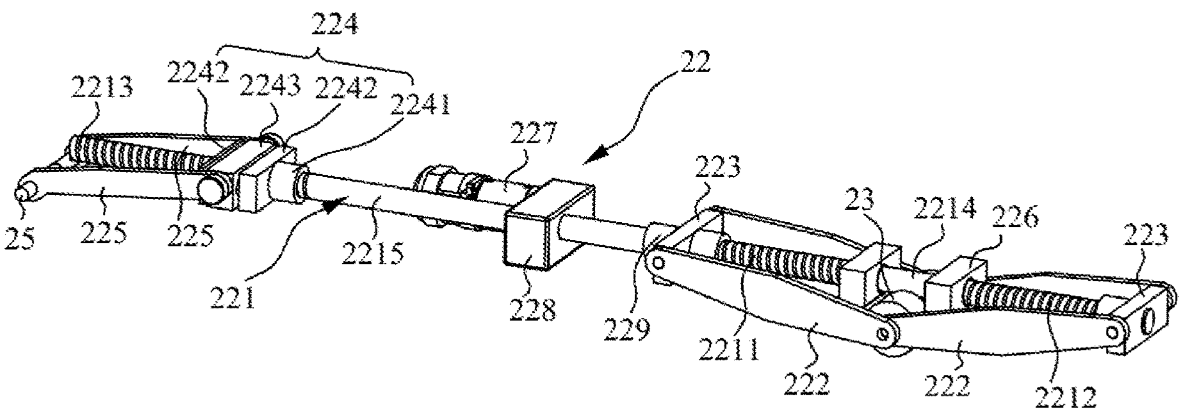
FIG. 8 is a structural diagram of a lifting driving mechanism according to embodiment one of the present application.
Figure 9:
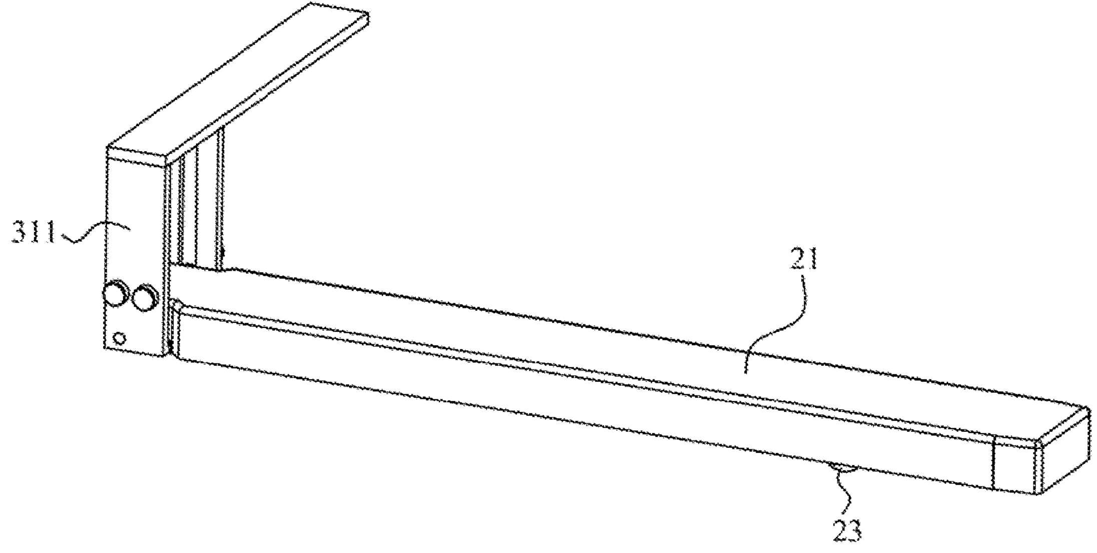
FIG. 9 is a diagram showing cooperation between a fork arm and a mounting bracket when the fork arm is in an initial state according to embodiment one of the present application.

As shown in FIG. 7 to FIG. 8, the fork arm 2 includes an arm body 21 protruding in the X direction, a lifting driving mechanism 22 and the support 23 arranged on the arm body 21. The lifting driving mechanism 22 is connected to the support 23 and is configured to drive the support 23 to raise or lower vertically relative to the arm body 21, to enable the support 23 to lower to a position that the support 23 can be supported on the ground. Therefore, when the carrying device 10 is in the protruding state of the fork arm 2 and the protruding and lifting state of the fork arm 2, the fork arm 2 can be supported by both the mounting bracket 31 and the support 23, thereby improving the use stability and load stability of the fork arm 2, preventing the fork arm 2 from bending or breaking, and improving the service life of the fork arm 2.

As shown in FIG. 2 and FIG. 4, since the support 23 is disposed close to the second end of the fork arm 2 and can move downwards to contact with the ground, in order to avoid the support 23, an end, away from the position-limiting groove wall 1121, of the accommodation groove 112 runs through a lower surface of the vehicle body 1, so that when the carrying device 10 is in the retracting and lifting state, the support 23 can contact the ground and provide supporting for the fork arm 2.

As shown in FIG. 7 to FIG. 12, the lifting driving mechanism 22 includes two first connecting rods 222 and a first driving assembly, one end of each of the first connecting rods 222 is hinged to the support 23, the other end of each of the first connecting rod 222 is connected to the first driving assembly, and the first driving assembly is configured to drive the other ends of the two first connecting rods 222 to closer or farther away from each other to raise or lower the support 23.

The first driving assembly includes a screw rod 221, two first nut seats 223 and a lifting driving motor 227, and the screw rod 221 includes a first thread segment 2211 and a second thread segment 2212 opposite in revolving direction.

The two first nut seats 223 are respectively sleeved on the first thread segment 2211 and the second thread segment 2212, and the other ends of the two first connecting rods 222 are respectively hinged to the two first nut seats 223. The lifting driving motor 227 is configured to drive the screw rod 221 to rotate, to drive the two first nut seats 223 to move towards each other or away from each other along the screw rod 221.

With such an arrangement, when the screw rod 221 rotates, the two first nut seats 223 move towards each other or away from each other synchronously, thereby driving the second ends of the two first connecting rods 222 to move towards each other or away from each other, and driving the support 23 to raise or lower vertically.

The arrangement of the above-described lifting driving mechanism 22 can ensure that the support 23 can only move in the vertical direction, restrict the support 23 from moving in the X direction, ensure the accuracy of the position of the support 23, and shorten the travel of movement of the first nut seat 223 relative to the screw rod 221. In other embodiments, one of the first nut seats 223 can also be replaced with a fixed seat that is fixed relative to the arm body 21, and the other first nut seat 223 slides along the screw rod 221 to drive the two first connecting rods 222 to move towards each other or away from each other. However, under this arrangement, the support 23 not only has a displacement in the Z direction, but also has a displacement in the X direction.

Two groups of first connecting rods 222 are respectively arranged on opposite sides of the screw rod 221 in the Y direction, and the two groups of first connecting rods 222 are respectively hinged to two ends of a wheel shaft of the support 23 to improve the stability of connection and supporting of the support 23. In other embodiments, only one group of first connecting rods 222 may be provided, for example, only one group of first connecting rods 222 is arranged directly below the screw rod 221.

In order to achieve the connection of the first nut seat 223 and the first connecting rod 222, the first nut seat 223 includes a sleeve part and a connecting plate part protruding from an outer surface of the sleeve part, and an inner wall of the sleeve part is provided with screw threads fitted with corresponding thread segment. The connecting plate part protrudes in the Y direction and the two ends of the connecting plate part are respectively hinged to the two first connecting rods 222. An upper side of the connecting plate part fits against the arm body 21 to prevent the first nut seat 223 from rotating relative to the arm body 21.

The support 23 is a supporting rolling wheel, and the wheel shaft of the supporting rolling wheel protrudes in the Y direction to ensure that the fork arm 2 can move in the X direction while being supported by the support 23, so as to improve the smoothness of the translation of the fork arm 2 and facilitate the adjustment to the fork arm 2.

In order to improve the support stability of the support 23 to the arm body 21, the support 23 includes the wheel shaft and at least two rolling wheel bodies arranged on the wheel shaft at an interval or intervals. The at least two wheel bodies are respectively located on opposite sides of the screw rod 221, and when the fork arm 2 is in the initial state, upper ends of the wheel bodies are higher than a lower side of the screw rod 221, so as to shorten the distance between the wheel shaft and the screw rod 221 and improve the compactness of the structure.

A screw rod seat 226 is further rotatably sleeved on the screw rod 221, and the screw rod seat 226 is provided with a plain hole for the screw rod 221 to pass through, and the screw rod seat 226 is connected to the arm body 21. The screw rod 221 includes a first plain shaft segment 2214 located between a first thread segment 2211 and a second thread segment 2212, the screw rod seat 226 is sleeved on the first plain shaft segment 2214, which can prevent the two first nut seats 223 from colliding with each other, and avoid abrasion to the threads on the screw rod 221.

Two screw rod seats 226 are respectively disposed at two ends of the first plain shaft segment 2214, and when the carrying device 10 is in the initial state, the support 23 is located between the two screw rod seats 226. With such an arrangement, the first nut seats 223 can be prevented from colliding with the support 23, and the relative movement travel of the first nut seats 223 is limited; moreover, the initial installation position of the support 23 can also be lifted, so that when the fork arm 2 is in the initial state, the support 23 is sandwiched between the two screw rod seats 226, to shorten the gap between the screw rod 221 and the support 23 in the initial state, thereby reducing the overall thickness of the fork arm 2 in the Z direction in the initial state and improving the compactness of the structure.

A position-limiting sleeve 229 is sleeved on an end of the first thread segment 2212 away from the screw rod seat 226, and an end of the second thread segment 2212 away from the screw rod seat 226 abuts against the arm body 21 to limit the travel of the corresponding first nut seats 223 when moving away from each other.

The lifting driving mechanism 22 may also synchronously drive the arm body 21 to raise or lower vertically relative to the mounting bracket 31, thereby simplifying the setting of the driving structure on the fork arm 2, reducing the cost and improving the compactness of the structure.

The lifting driving mechanism 22 includes a second connecting rod 225 and a second driving assembly. A first end of the second connecting rod 225 is hinged to the mounting bracket 31, and another end of the second connecting rod 225 supports the arm body 21. The second driving assembly is configured to drive the second connecting rod 225 to rotate to raise or lower the arm body 21. By setting the rotation of the second connecting rod 225 to drive the arm body 21 to raise or lower, the rotation stability can be improved, and the space occupied by the lifting driving mechanism 22 in the vertical direction can be reduced to reduce the cost.

In this embodiment, the second driving assembly includes the above-described screw rod 221 and lifting driving motor 227, and further includes a second nut seat 224. The screw rod 221 includes a third thread segment 2213, the second nut seat 224 is rotatably sleeved on the third thread segment 2213, and a second end of the second connecting rod 225 is hinged to the second nut seat 224. Such an arrangement enables the first driving assembly and the second driving assembly to share the screw rod 221 and the lifting driving motor 227, which reduces costs and simplifies the structure. In other embodiments, the first driving assembly and the second driving assembly may be arranged separately.

In this embodiment, a first end of the second connecting rod 225 is hinged to a bottom end of the bracket part 311, and the second connecting rod 225 is located on a side of the second nut seat 224 facing towards the mounting bracket 31, and the third thread segment 2213 and the second thread segment 2212 have the same thread direction. Further, when the fork arm 2 is in the initial state, the screw rod 221 is higher than the first end of the second connecting rod 225, and the second connecting rod 225 protrudes obliquely upward in the direction from the first end to the second end. With this arrangement, when the arm body 21 needs to be raised, the second nut seat 224 moves towards the mounting bracket 31, and the second end of the second connecting rod 225 turns upwards around the first end of the second connecting rod 225, thereby driving the screw rod 221 to be raised.

Since the carrying device 10 has the protruding state of the fork arm 2 and the protruding and lifting state of the fork arm 2, in order to ensure that the support 23 can be lowered to contact with the ground when the carrying device 10 is in the protruding state and in the protruding and lifting state, the second nut seat 224 includes a thread sleeve part 2241 and a sliding seat part 2243 slidably sleeved on the thread sleeve part 2241, the thread sleeve part 2241 and the third thread segment 2213 are in transmission fit, the thread sleeve part 2241 is provided with two position-limiting seat parts 2242 for limiting the sliding travel of the sliding seat part 2243, and the second connecting rod 225 is hinged to the sliding seat part 2243.

Taking the direction shown in FIG. 8 as an example, when the carrying device 10 is in the initial state, there is a certain gap between the sliding seat part 2243 and the position-limiting seat part 2242 on the right side, and thus, in an initial stage in which the second nut seat 224 moves along the screw rod 221, the sliding seat part 2243 slides relative to the thread sleeve part 2241, the sliding seat part 2243 does not move, and the first connecting rod 222 does not act, that is, the screw rod 221 does not raise or lower, and only the support 23 raises or lowers. After the sliding seat part 2243 slides to abut against the position-limiting seat part 2242 on the right side, the further movement of the thread sleeve part 2241 along the screw rod 221 drives the sliding seat part 2243 to move along the screw rod 221, and then drives the first connecting rod 222 to act, so that the screw rod 221 is raised. When the fork arm 2 is in the initial state, the gap between the sliding seat part 2243 and the position-limiting seat part 2242 on the right side can be set according to the height of the support 23 from the ground.

In this embodiment, two second connecting rods 225 are provided, the two second connecting rods 225 are respectively located on opposite sides of the screw rod 221, and an upper end of each of the second connecting rods 225 is hinged to the sliding seat part 2243. This arrangement can effectively achieve the synchronous raising or lowering of the two ends of the second connecting rods 225 and improve the stability of the raising or lowering movement of the arm body 21.

Figure 10:
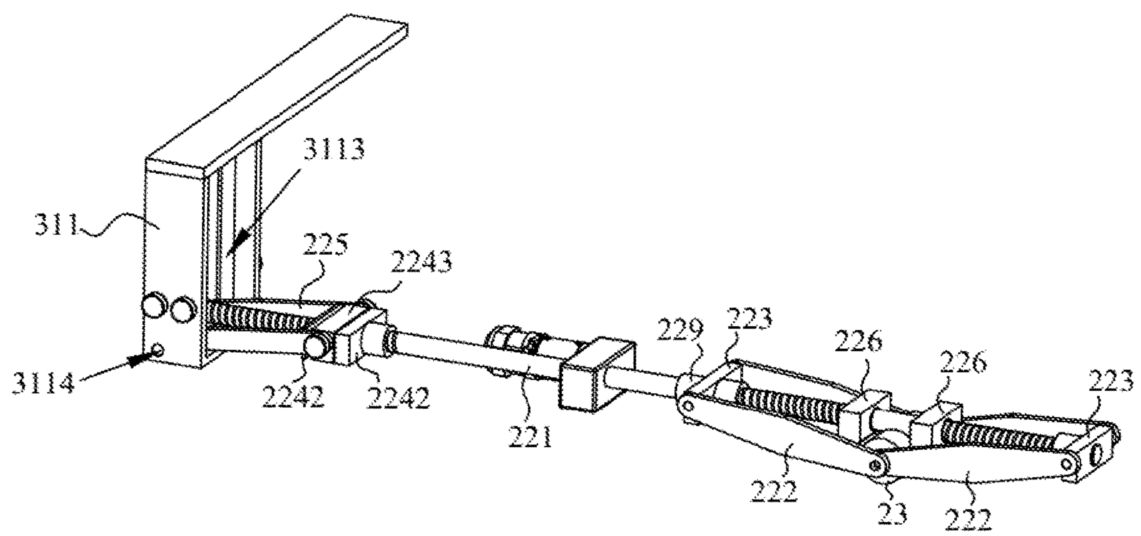
FIG. 10 is a structural diagram of the structure in FIG. 9 with an arm body being removed.
Figure 11:
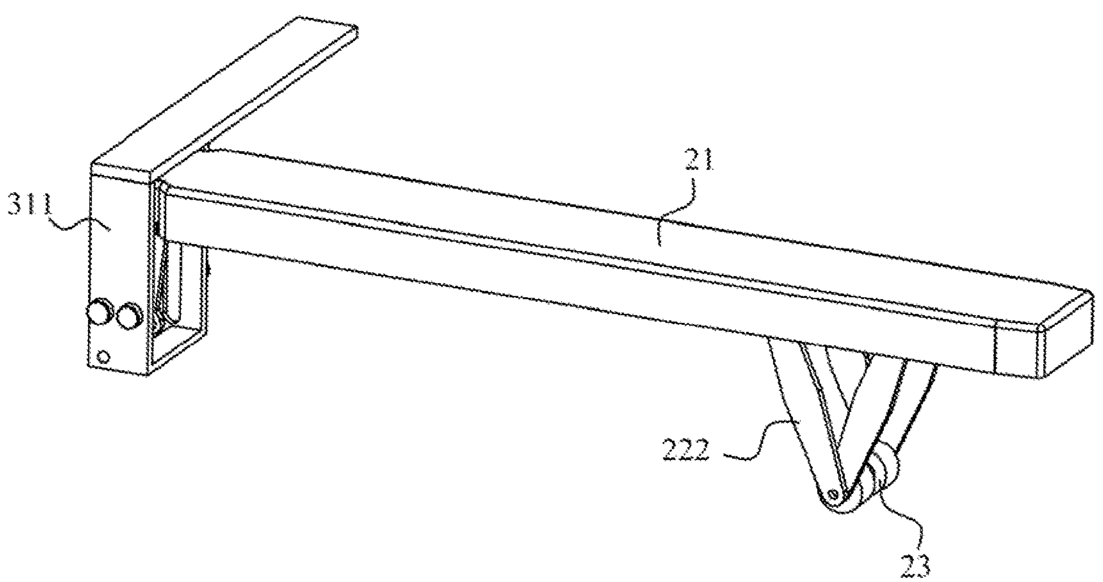
FIG. 11 is a diagram showing cooperation between a fork arm and a mounting bracket when the fork arm is in a lifting state according to embodiment one of the present application.

In order to improve the convenience of the hinge between the second connecting rod 225 and the mounting bracket 31, the fork arm 2 further includes a hinge shaft 25, the hinge shaft 25 protrudes in the Y direction, and the lower ends of the two second connecting rods 225 are hinged to the hinge shaft 25. As shown in FIG. 10, the side plates 3111 of the mounting bracket 31 are each provided with a hinge hole 3114, and two ends of the hinge shaft 25 are respectively inserted into the two hinge holes 3114.

The screw rod 221 further includes a second plain shaft segment 2215 located between the first thread segment 2211 and the third thread segment 2213. The lifting driving motor 227 is in transmission connection with the second plain shaft segment 2215 through a speed reducer 228. The setting of the speed reducer 228 can reduce the rotation speed of the screw rod 221 and increase the torque of the screw rod 221, thereby improving the operating stability of the lifting driving mechanism 22.

In other embodiments, the lifting driving mechanism 22 that drives the support 23 to raise or lower vertically and the lifting driving mechanism 22 that drives the arm body 21 to raise or lower vertically relative to the mounting bracket 31 can be provided separately, and each of the two sets of lifting driving mechanisms 22 may adopt a driving structure form such as a structure of a motor in cooperation with a sprocket and a chain, a screw rod-nut mechanism, crank-slider mechanism or connecting rod mechanism, or adopt a linear driving structure such as a linear motor or a hydraulic cylinder. The above-described various linear driving structures are relatively common, which are not repeated here.

The arm body 21 is a long box-shaped structure with an opening at a lower end, which is formed with a cavity with the opening at the lower end. The screw rod 221, the lifting driving motor 227 and the speed reducer 228 are accommodated in the cavity to protect the lifting driving mechanism 22 and further improve the structure compactness and the aesthetic appearance of the fork arm 2.

Figure 12:
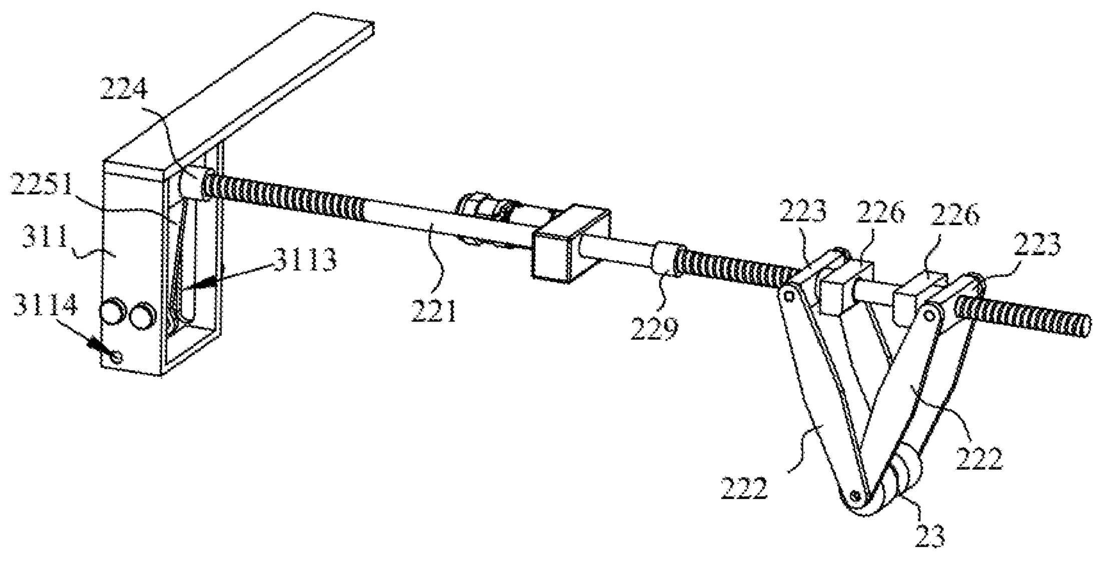
FIG. 12 is a structural diagram of the structure in FIG. 11 with an arm body being removed.
Figure 13:
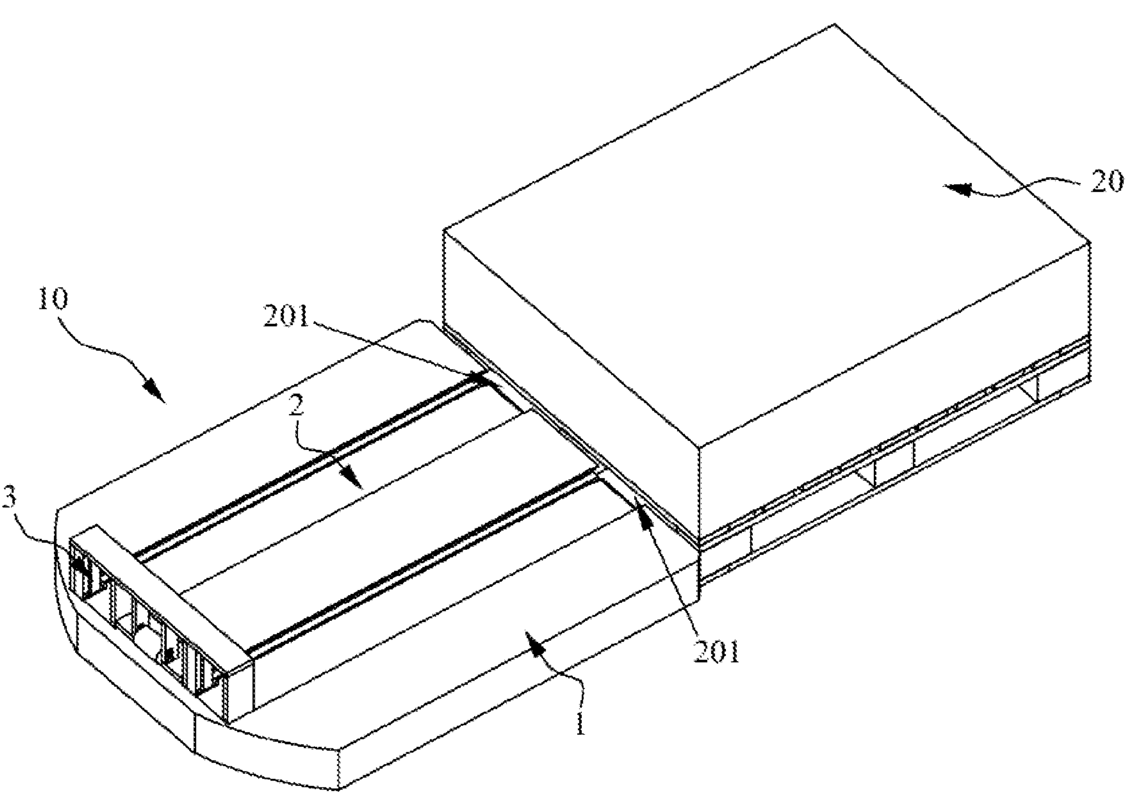
FIG. 13 is a diagram showing that a carrying device is docked to a pallet when the carrying device is in an initial state according to embodiment two of the present application.
Figure 14:
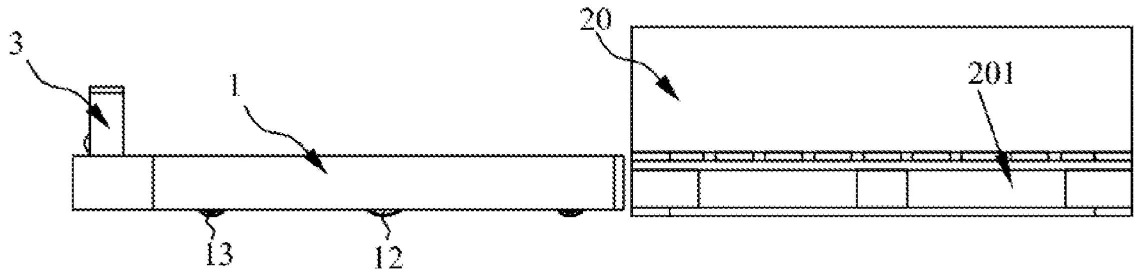
FIG. 14 is a front view of the structure in FIG. 13.
Figure 15:
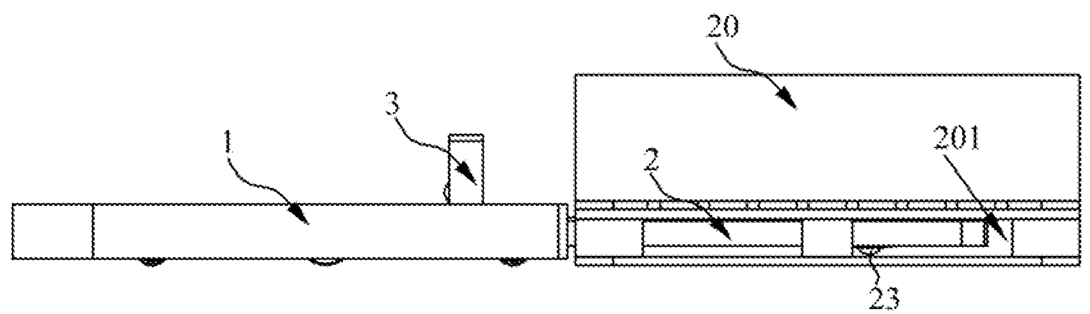
FIG. 15 is a diagram showing that a carrying device is docked to a pallet when the carrying device is in a state in which a fork arm protrudes out according to embodiment two of the present application.
Figure 16:
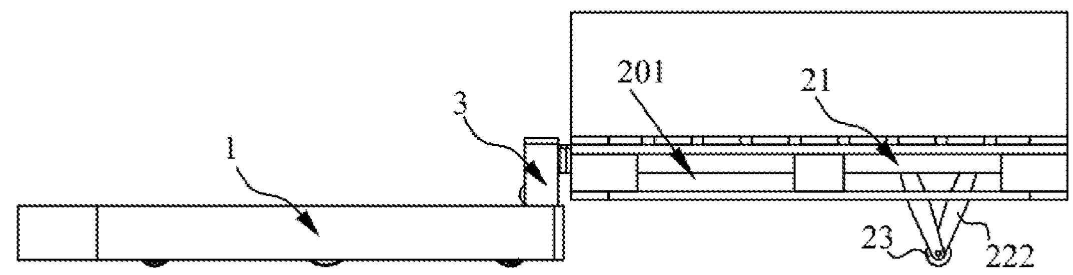
FIG. 16 is a diagram showing that a carrying device is docked to a pallet when the carrying device is in a state in which a fork arm protrudes out and raises according to embodiment two of the present application.
Figure 17:
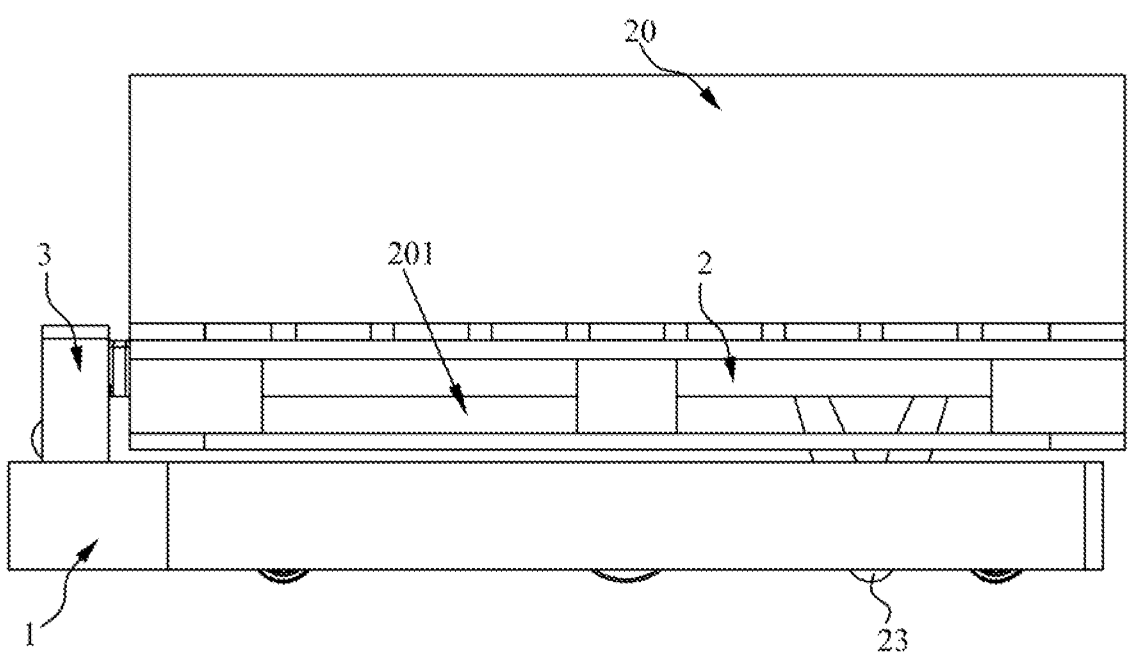
FIG. 17 is a diagram showing that a carrying device is docked to a pallet when the carrying device is in a state in which a fork arm retracts and raises according to embodiment two of the present application.
Figure 18:
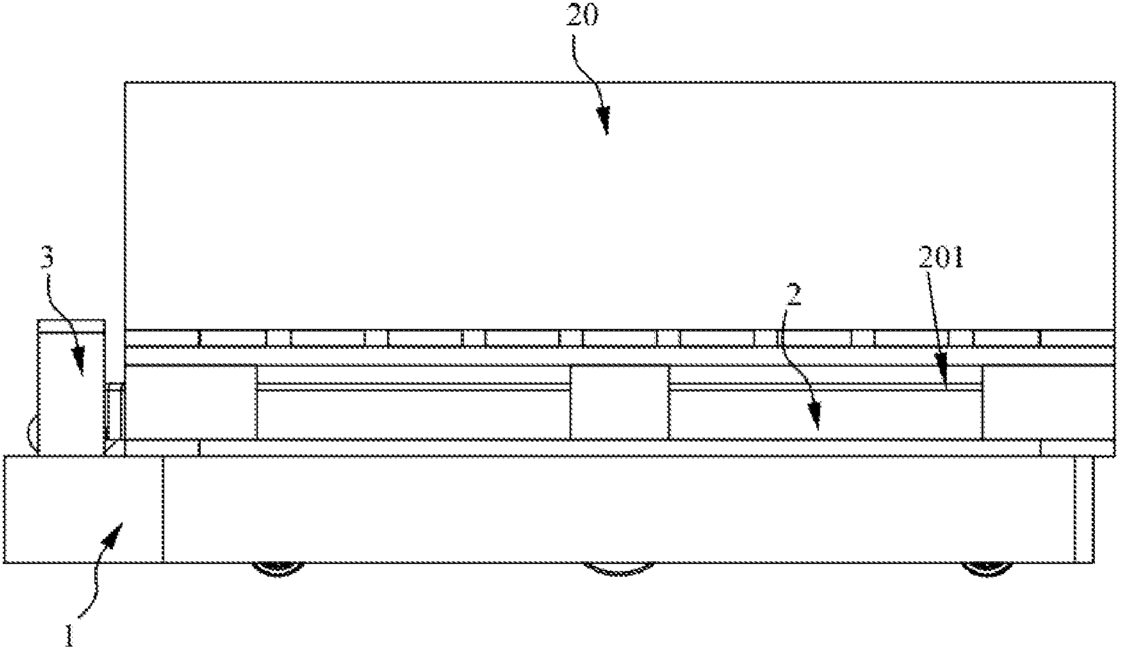
FIG. 18 is a diagram showing that a carrying device is docked to a pallet when the carrying device is in a state in which the carrying device is docked in place according to embodiment two of the present application.

As shown in FIG. 12, in order to improve the stability of sliding of the arm body 21 relative to the mounting bracket 31, the two side plates 3111 of the bracket part 311 are each provided with a Z-direction guide groove 3113 in its inner side, and the Z-direction guide groove 3113 extends in the Z-direction. Opposite sides of the arm body 21 in the Y-direction are each provided with a guide member, the guide members protrude into the corresponding Z-direction guide grooves 3113 and are fitted with the groove walls of the Z guide grooves 3113 in a sliding or rolling manner. As shown in FIG. 7, in this embodiment, the guide member is a third guide rolling wheel 24, and at least two third guide rolling wheels 24 are provided in the Z direction.

A warehousing logistics system is further provided according to this embodiment. The warehousing logistics system includes a pallet 20 and the above-described carrying device 10. By using the above-described carrying device 10 to carry the pallet 20, the convenience and flexibility of carrying the pallet 20 can be improved, the operating efficiency of the warehousing logistics system can be improved and the operating cost of the warehousing logistics system can be reduced.

Embodiment Two

As shown in FIG. 13 to FIG. 18, a pallet carrying method is provided in this embodiment. The pallet carrying method applies the carrying device 10 in embodiment one to carry the pallet 20.

The pallet carrying method according to this embodiment includes steps S1 to S14.

In the step S1, the carrying device 10 travels to the front of the pallet 20, and enables the fork arm 2 of the carrying device 10 face the fork hole 201 of the pallet 20.

The carrying device 10 automatically travels to the front of the pallet 20 through a navigation system, and the automatic navigation of the carrying device 10 may be set according to related art.

In the step S2, the horizontal driving unit travels forwards, and drives the mounting bracket 31 to move relative to the vehicle body 1 in the X direction, so that the fork arm 2 protrudes in the X direction and is inserted into the fork hole 201.

In this embodiment, the electric roller 32 rotates to drive the mounting bracket 31 to move in the X direction.

In the step S3, after the free end of the fork arm 2 protrudes out of the vehicle body 1 for a set distance, the lifting driving mechanism 22 moves forwards, to drive the support 23 to lower relative to the arm body 21 to contact with the ground.

After the free end of the fork arm 2 protrudes out of the vehicle body 1 for a set distance, the support 23 is supported on the ground to provide auxiliary supporting for the fork arm 2 and prevent the fork arm 2 from being bent.

In the step S4, after the fork arm 2 continues to protrude to the maximum distance, the horizontal driving unit stops travelling.

In the step S5, the lifting driving mechanism 22 travels forwards to enable the arm body 21 to raise relative to the mounting bracket 31, and at the same time, the support 23 lowers relative to the arm body 21 until the bottom of the pallet 20 is raised to a preset height relative to the ground.

In this embodiment, the screw rod 221 rotates to drive two first nut seats 223 to move towards each other and drive the support 23 to lower relative to the arm body 21; at the same time, the second nut seat 224 slides towards the mounting bracket 31 and drives the second connecting rod 225 to turn upwards around the hinge shaft 25.

In the step S6, the driving wheel mechanism acts so that the vehicle body 1 moves to a space under the bottom of the pallet 20 in the X direction on the premise that the fork arm 2 and the mounting bracket 31 remain stationary.

In the step S7, the lifting driving mechanism 22 acts reversely to drive the arm body 21 to lower relative to the mounting bracket 31 and the support 23 to raise relative to the arm body 21 until the arm body 21 drives the pallet 20 downwards to contact with the upper surface of the vehicle body 1.

In this embodiment, the screw rod 221 rotates reversely, the two first nut seats 223 travel away from each other, and the height between the support 23 and the screw rod 221 decreases; meanwhile, the second nut seat 224 slides in a direction away from the mounting bracket 31 so that the second connecting rod 225 turns downwards around the hinge shaft 25 and drives the arm body 21 to move downwards, thereby driving the pallet 20 born on the arm body 21 to lower.

In the step S8, the screw rod 221 continues to move reversely, the sliding seat part 2243 fixedly slides relative to the position-limiting seat part 2242, the support 23 moves upwards until it is out of contact with the ground, and the carrying device 10 reaches the docking-in-place state.

In the step S9, the carrying device 10 carries the pallet 20 to a predetermined destination.

In the step S10, the lifting driving mechanism 22 acts forwardly to drive the screw rod 221 to raise to a set height, and at the same time, the support 23 moves downwards relative to the arm body 21 until the support 23 contacts the ground.

In the step S11, the driving wheel mechanism 12 acts reversely so that the vehicle body 1 moves out of the space under the bottom of the pallet 20 relative to the mounting bracket 31 and the fork arm 2.

In the step S12, the lifting driving mechanism 22 acts reversely to drive the screw rod 221 to lower so that the arm body 21 drives the pallet 20 downwards to contact with the ground, and at the same time, the support 23 moves upwards relative to the arm body 21.

In the step S13, the horizontal driving unit acts reversely so that the mounting bracket 31 and the fork arm 2 move relative to the vehicle body 1 until the fork arm 2 disengages from the fork hole 201 and the mounting bracket 31 and the fork arm 2 return to the initial positions.

In the step S14, the screw rod 221 rotates reversely to drive the support 23 to continue moving towards the arm body 21 until the support 23 is off the ground.

The step S13 and the step S14 may be performed simultaneously, or may be performed sequentially.

According to the pallet carrying method provided in this embodiment, the pallet 20 is carried by the above-described carrying device 10, the flexibility and applicability of carrying the pallet 20 can be improved, and the turning radius and the occupied space during carrying the pallet 20 can be reduced.

Embodiment Three

A pallet carrying method is provided according to this embodiment. The pallet carrying method applies the carrying device 10 in embodiment one to carry the pallet 20, and the pallet carrying method according to this embodiment is basically the same as the pallet carrying method according to embodiment two, only part of steps are different, and the same steps as those in embodiment two are not repeated in this embodiment.

The pallet carrying method includes the steps described below.

For the step S1 to the step S5, reference may be made to embodiment two.

In the step S6, the vehicle body 1 remains stationary, the horizontal driving unit rotates reversely to drive the mounting bracket 31 and the fork arm 2 to move backwards relative to the vehicle body 1 until the fork arm 2 returns to be above the vehicle body 1.

For the step S7 to the step S10, reference may be made to embodiment two.

In the step S11, the vehicle body 1 remains stationary, and the horizontal driving unit rotates forwards to drive the mounting bracket 31 and the fork arm 2 to protrude forwards until the vehicle body 1 is separated from the bottom of the pallet 20.

For the step S12 to step S14, reference may be made to embodiment two.

In specific implementations, the step S6 may adopt the step S6 in embodiment two, the step S11 may adopt the step S11 in embodiment three; or the step S6 may adopt the step S6 in embodiment three, and the step S11 may adopt the step S11 in embodiment two, as long as the relative movement between the fork arm 2 and the vehicle body 1 can be achieved.

What is claimed is:

1. A carrying device, configured to carry a pallet, the carrying device comprising:

a vehicle body, which is configured to move autonomously;

a mounting bracket, which is horizontally slidably disposed on the vehicle body; and a fork arm, wherein a first end of the fork arm is connected to the mounting bracket; the fork arm is configured to protrude horizontally along with movement of the mounting bracket to be inserted into a fork hole of the pallet, and raise or lower relative to the mounting bracket to lift the pallet; and the vehicle body and the mounting bracket are configured to, when the fork arm lifts the pallet, enable the pallet to be located above the vehicle body by relative movement between the vehicle body and the mounting bracket;

wherein the fork arm is configured to switch between being supported on ground and off the ground so that the fork arm crosses over a bottom beam of the pallet in a case of being off the ground, and after the fork arm is partially inserted into the fork hole, the fork arm partially located inside the fork hole is supported on the ground;

wherein the fork arm comprises:

an arm body, wherein an end of the arm body is connected to the mounting bracket; and a support, which is disposed on the arm body and spaced from the mounting bracket, and is configured to protrude downwards relative to the arm body to support the fork arm and configured to retract upwards to enable the fork arm to be off the ground to enable the fork arm to cross over the bottom beam of the pallet;

wherein the fork arm further comprises a lifting driving mechanism configured to drive the support to raise or lower relative to the arm body, and drive the arm body to raise or lower relative to the mounting bracket;

wherein the lifting driving mechanism comprises:

two first connecting rods, wherein one end of each first connecting rod of the two first connecting rods is hinged to the support; and a first driving assembly, wherein another end of each first connecting rod is connected to the first driving assembly, and the first driving assembly is configured to drive other ends of the two first connecting rods to move towards each other or away from each other to raise or lower the support; and wherein the first driving assembly comprises:

a screw rod comprising a first thread segment and a second thread segment in opposite thread directions;

two first nut seats, which are sleeved on the first thread segment and the second thread segment, respectively, and the other ends of the two first connecting rods are respectively hinged to the two first nut seats; and a lifting driving motor, which is configured to drive the screw rod to rotate to drive the two first nut seats to move towards each other or away from each other along the screw rod.

2. The carrying device according to claim 1, further comprising:

a horizontal driving unit, which is disposed on the mounting bracket and is configured to drive the mounting bracket to move horizontally relative to the vehicle body.

3. The carrying device according to claim 2, wherein the horizontal driving unit comprises:

a rolling member, which is rotatably disposed on the mounting bracket and is in rolling contact with an upper surface of the vehicle body; and a horizontal driving motor, which is configured to drive the rolling member to rotate;

wherein the mounting bracket is further provided with an elastic member, and the elastic member is configured to elastically press the rolling member on the upper surface of the vehicle body.

4. The carrying device according to claim 1, wherein an upper surface of the vehicle body is provided with an accommodation groove, and the fork arm is accommodated in the accommodation groove; and wherein the mounting bracket is configured to move along a groove wall of the accommodation groove;

wherein the mounting bracket is configured to move along a groove wall of the accommodation groove.

5. The carrying device according to claim 1, wherein a bearing surface configured to bear the pallet is formed on an upper surface of the vehicle body, and when the pallet moves directly above the vehicle body, the bearing surface is configured to support the pallet.

6. The carrying device according to claim 1, wherein when the fork arm protrudes relative to the vehicle body and lifts the pallet, the vehicle body is configured to autonomously move to a bottom of the pallet relative to the fork arm on a premise that the mounting bracket is stationary.

7. The carrying device according to claim 1, wherein two fork arms are arranged at an interval in a width direction of the two fork arms, the vehicle body is provided with at least one pair of driving wheels arranged symmetrically in the width direction, and the two fork arms are arranged symmetrically relative to a symmetry axis of the at least one pair of driving wheels.

8. The carrying device according to claim 1, wherein the lifting driving mechanism comprises:

a second connecting rod, wherein a first end of the second connecting rod is hinged to the mounting bracket, and a second end of the second connecting rod is configured to support the arm body; and a second driving assembly, which is configured to drive the second connecting rod to rotate to raise or lower the arm body;

wherein the second driving assembly comprises:

a screw rod comprising a third thread segment;

a second nut seat, which is rotatably sleeved on the third thread segment, and the second end of the second connecting rod is hinged to the second nut seat; and a lifting driving motor, which is configured to drive the screw rod to rotate to drive the second nut seat to move; and wherein the second nut seat comprises a thread sleeve part and a sliding seat part slidingly sleeved on the thread sleeve part, the thread sleeve part and the third thread segment are in transmission fit, the thread sleeve part is provided with two position-limiting seat parts configured to limit a sliding travel of the sliding seat part, and the second connecting rod is hinged to the sliding seat part.

9. A warehousing logistics system, comprising the carrying device of claim 1, and a pallet;

wherein the carrying device is configured to carry the pallet.

10. A carrying device, configured to carry a pallet, the carrying device comprising:

a vehicle body, which is configured to move autonomously;

a mounting bracket, which is horizontally slidably disposed on the vehicle body; and a fork arm, wherein a first end of the fork arm is connected to the mounting bracket; the fork arm is configured to protrude horizontally along with movement of the mounting bracket to be inserted into a fork hole of the pallet, and raise or lower relative to the mounting bracket to lift the pallet; and the vehicle body and the mounting bracket are configured to, when the fork arm lifts the pallet, enable the pallet to be located above the vehicle body by relative movement between the vehicle body and the mounting bracket;

wherein the fork arm is configured to switch between being supported on ground and off the ground so that the fork arm crosses over a bottom beam of the pallet in a case of being off the ground, and after the fork arm is partially inserted into the fork hole, the fork arm partially located inside the fork hole is supported on the ground;

wherein the fork arm comprises:

an arm body, wherein an end of the arm body is connected to the mounting bracket; and a support, which is disposed on the arm body and spaced from the mounting bracket, and is configured to protrude downwards relative to the arm body to support the fork arm and configured to retract upwards to enable the fork arm to be off the ground to enable the fork arm to cross over the bottom beam of the pallet;

wherein the fork arm further comprises a lifting driving mechanism configured to drive the support to raise or lower relative to the arm body, and drive the arm body to raise or lower relative to the mounting bracket;

wherein the lifting driving mechanism comprises:

a second connecting rod, wherein a first end of the second connecting rod is hinged to the mounting bracket, and a second end of the second connecting rod is configured to support the arm body; and a second driving assembly, which is configured to drive the second connecting rod to rotate to raise or lower the arm body;

wherein the second driving assembly comprises:

a screw rod comprising a third thread segment;

a second nut seat, which is rotatably sleeved on the third thread segment, and the second end of the second connecting rod is hinged to the second nut seat; and a lifting driving motor, which is configured to drive the screw rod to rotate to drive the second nut seat to move; and wherein the second nut seat comprises a thread sleeve part and a sliding seat part slidingly sleeved on the thread sleeve part, the thread sleeve part and the third thread segment are in transmission fit, the thread sleeve part is provided with two position-limiting seat parts configured to limit a sliding travel of the sliding seat part, and the second connecting rod is hinged to the sliding seat part.

11. A warehousing logistics system, comprising the carrying device of claim 10, and a pallet;

wherein the carrying device is configured to carry the pallet.

* * * * *